(12) United States Patent
Hsu et al.

(10) Patent No.: US 11,641,515 B2
(45) Date of Patent: May 2, 2023

(54) IMAGE CAPTURING MECHANISM

(71) Applicant: TDK TAIWAN CORP., Taoyuan (TW)

(72) Inventors: Chan-Jung Hsu, Taoyuan (TW); Yi-Ho Chen, Taoyuan (TW)

(73) Assignee: TDK TAIWAN CORP., Taoyuan (TW)

( * ) Notice: Subject to any disclaimer, the term of this patent is extended or adjusted under 35 U.S.C. 154(b) by 0 days.

(21) Appl. No.: 17/486,061

(22) Filed: Sep. 27, 2021

(65) Prior Publication Data
US 2022/0103728 A1 Mar. 31, 2022

Related U.S. Application Data

(60) Provisional application No. 63/084,312, filed on Sep. 28, 2020.

(51) Int. Cl.
| | | |
|---|---|---|
| *H04N 5/225* | (2006.01) | |
| *G02B 7/09* | (2021.01) | |
| *G02B 27/64* | (2006.01) | |
| *H04N 5/232* | (2006.01) | |
| *G03B 5/00* | (2021.01) | |
| *G02B 7/08* | (2021.01) | |
| *G02B 7/04* | (2021.01) | |
| *G02B 7/02* | (2021.01) | |
| *G02B 27/62* | (2006.01) | |
| *H02K 33/18* | (2006.01) | |
| *G01D 5/12* | (2006.01) | |

(52) U.S. Cl.
CPC .......... *H04N 5/2254* (2013.01); *G02B 7/025* (2013.01); *G02B 7/04* (2013.01); *G02B 7/08* (2013.01); *G02B 7/09* (2013.01); *G02B 27/62* (2013.01); *G02B 27/646* (2013.01); *G03B 5/00* (2013.01); *H02K 33/18* (2013.01); *H04N 5/2252* (2013.01); *H04N 5/232* (2013.01); *G01D 5/12* (2013.01); *G03B 2205/0069* (2013.01)

(58) Field of Classification Search
CPC .... H04N 5/2254; H04N 5/2252; H04N 5/232; H04N 5/2253; H04N 5/2257; G02B 7/025; G02B 7/04; G02B 7/08; G02B 7/09; G02B 27/62; G02B 27/646; G02B 13/001; G03B 5/00; G03B 2205/0069; G03B 3/02; G03B 3/10; G03B 5/06; G03B 30/00; H02K 33/18; H02K 41/0356; G01D 5/12
USPC ........................................................ 348/373
See application file for complete search history.

(56) References Cited

U.S. PATENT DOCUMENTS

| | | | | |
|---|---|---|---|---|
| 5,610,656 A | * | 3/1997 | Bernhardt | ............ H04N 5/2252 348/E5.026 |
| 2006/0176583 A1 | * | 8/2006 | Jin | ........................... G11B 7/22 |
| 2011/0013283 A1 | * | 1/2011 | Sato | ..................... G02B 27/646 359/557 |

(Continued)

Primary Examiner — Usman A Khan
(74) Attorney, Agent, or Firm — Muncy, Geissler, Olds & Lowe, P.C.

(57) ABSTRACT

An image capturing mechanism is provided, including a base module, a ball element, and a movable module. The base module has a frame, a substrate movably disposed in the frame, and an image sensor disposed on the substrate. The ball element is disposed between the frame and the substrate, whereby the image sensor and the substrate are movable relative to the frame. The movable module is configured to hold an optical element and is movably connected to the base module.

19 Claims, 18 Drawing Sheets

(56) References Cited

U.S. PATENT DOCUMENTS

| | | | |
|---|---|---|---|
| 2011/0075999 A1* | 3/2011 | Chiu | H02K 41/0356 |
| | | | 359/557 |
| 2011/0292509 A1* | 12/2011 | Yasuda | G02B 27/646 |
| | | | 359/554 |
| 2014/0362284 A1* | 12/2014 | Shin | H04N 5/2254 |
| | | | 348/373 |
| 2015/0146025 A1* | 5/2015 | Bang | H04N 5/23248 |
| | | | 348/208.99 |
| 2016/0252746 A1* | 9/2016 | Kim | G03B 29/00 |
| | | | 359/557 |
| 2017/0139225 A1* | 5/2017 | Lim | H04N 5/23287 |
| 2018/0109660 A1* | 4/2018 | Yoon | G02B 13/0035 |
| 2018/0267294 A1* | 9/2018 | Aschwanden | G02B 26/101 |
| 2019/0123082 A1* | 4/2019 | Lee | H01L 24/19 |
| 2021/0048730 A1* | 2/2021 | Jeong | G02B 27/646 |

\* cited by examiner

IMAGE CAPTURING MECHANISM

CROSS REFERENCE TO RELATED APPLICATIONS

This application claims priority of provisional U.S. Patent Application Ser. No. 63/084,312, filed on Sep. 28, 2020, the entirety of which is incorporated by reference herein.

BACKGROUND OF THE INVENTION

Field of the Invention

The application relates in general to an optical mechanism, and in particular, to an optical mechanism that has an image sensor.

Description of the Related Art

As technology has advanced, a lot of electronic devices (for example, laptop computers and smartphones) have incorporated the functionality of taking photographs and recording video. These electronic devices have become more commonplace, and have been developed to be more convenient and thin. More and more options are provided for users to choose from.

In some electronic devices, several coils and magnets are usually used for adjusting the focus of a lens. However, miniaturization of the electronic devices may increase the difficulty of mechanical design, and it may also lead to low reliability and a low driving force for moving the lens. Therefore, addressing the aforementioned problems has become a challenge.

BRIEF SUMMARY OF INVENTION

In view of the aforementioned problems, the object of the invention is to provide an optical mechanism that includes a base module, a ball element, and a movable module. The base module has a frame, a substrate movably disposed in the frame, and an image sensor disposed on the substrate. The ball element is disposed between the frame and the substrate, whereby the image sensor and the substrate are movable relative to the frame. The movable module is configured to hold an optical element and is movably connected to the base module.

In some embodiments, the base module has a metal member embedded in the substrate, and the ball element contacts the metal member.

In some embodiments, the substrate comprises plastic material, and the metal member is integrally formed with the plastic substrate in one piece by insert molding.

In some embodiments, the substrate has an opening, the metal member is exposed to the opening, and the ball element is received in the opening.

In some embodiments, the opening has a width greater than the diameter of the ball element.

In some embodiments, the frame is rectangular in shape and has a protrusion, and the ball element is held between the metal member and the protrusion of the frame.

In some embodiments, the protrusion is located at a corner of the frame.

In some embodiments, the protrusion has a recess for receiving the ball element.

In some embodiments, the base module further has a coil element disposed on the substrate, and the movable module has a hollow member, a holder movably disposed in the hollow member for holding the optical element, and a magnetic element disposed on the hollow member, wherein when the coil element is energized by a current signal, the magnetic element and the coil element produce an electromagnetic force driving the substrate and the image sensor to move relative to the frame.

In some embodiments, the base module further has a circuit board disposed on a bottom side of the substrate, and the image sensor is electrically connected to the circuit board.

In some embodiments, the base module further has a magnetic field sensor disposed through the substrate and electrically connected to the circuit board for detecting a magnetic field of the magnetic element.

In some embodiments, the base module further has a coil element disposed on the substrate, and the movable module has a hollow member and a magnetic element disposed on the hollow member, wherein the coil element has a pair of planar coils arranged along a first axis and located corresponding to the magnetic element, and when the pair of planar coils is energized by two current signals of the same direction, the substrate and the image sensor are driven to rotate around an optical axis of the optical element relative to the frame.

In some embodiments, the movable module further has two magnetic elements disposed on the hollow member, and the coil element further has two pairs of planar coils disposed on opposite sides of the coil element and located corresponding to the magnetic elements, wherein when the two pairs of planar coils are energized by a plurality of current signals of the same direction, the substrate and the image sensor are driven to rotate around the optical axis of the optical element relative to the frame.

In some embodiments, the movable module has a hollow member, a holder movably disposed in the hollow member for holding the optical element, a coil disposed on the holder, and a magnetic element disposed on the hollow member, wherein when the coil is energized by a current signal, the magnetic element and the coil produce an electromagnetic force driving the holder and the optical element to move relative to the hollow member.

In some embodiments, the movable module further has a first spring sheet movably connecting the holder to the hollow member.

In some embodiments, the movable module further has a second spring sheet movably connecting the hollow member to the frame.

In some embodiments, the optical mechanism further comprises a cover, a coil element, a roller, and a guiding member, and the movable module has a hollow member and a magnetic element disposed on the hollow member, wherein the coil element is disposed on an inner surface of the cover, the guiding member is affixed to the hollow member, and the roller is disposed between the cover and the guiding member, wherein when the coil element is energized by a current signal, the magnetic element and the coil element produce an electromagnetic force driving the movable module to move relative to the cover.

In some embodiments, the guiding member forms a groove for receiving the roller.

In some embodiments, the base module further has a restricting member affixed to a bottom side of the frame, and the frame has a protrusion, wherein the substrate is restricted between the protrusion and the restricting member.

In some embodiments, the substrate, the restricting member, and the protrusion of the frame partially overlap when viewed along an optical axis of the optical element.

BRIEF DESCRIPTION OF DRAWINGS

The invention can be more fully understood by reading the subsequent detailed description and examples with references made to the accompanying drawings, wherein.

DETAILED DESCRIPTION OF INVENTION

The making and using of the embodiments of the image capturing mechanism are discussed in detail below. It should be appreciated, however, that the embodiments provide many applicable inventive concepts that can be embodied in a wide variety of specific contexts. The specific embodiments discussed are merely illustrative of specific ways to make and use the embodiments, and do not limit the scope of the disclosure.

Unless defined otherwise, all technical and scientific terms used herein have the same meaning as commonly understood by one of ordinary skill in the art to which this invention belongs. It should be appreciated that each term, which is defined in a commonly used dictionary, should be interpreted as having a meaning conforming to the relative skills and the background or the context of the present disclosure, and should not be interpreted in an idealized or overly formal manner unless defined otherwise.

In the following detailed description of the preferred embodiments, reference is made to the accompanying drawings, and in which specific embodiments of which the invention may be practiced are shown by way of illustration. In this regard, directional terminology, such as "top," "bottom," "left," "right," "front," "back," etc., is used with reference to the orientation of the figures being described. The components of the present invention can be positioned in a number of different orientations. As such, the directional terminology is used for the purposes of illustration and is in no way limiting.

Figure 1:
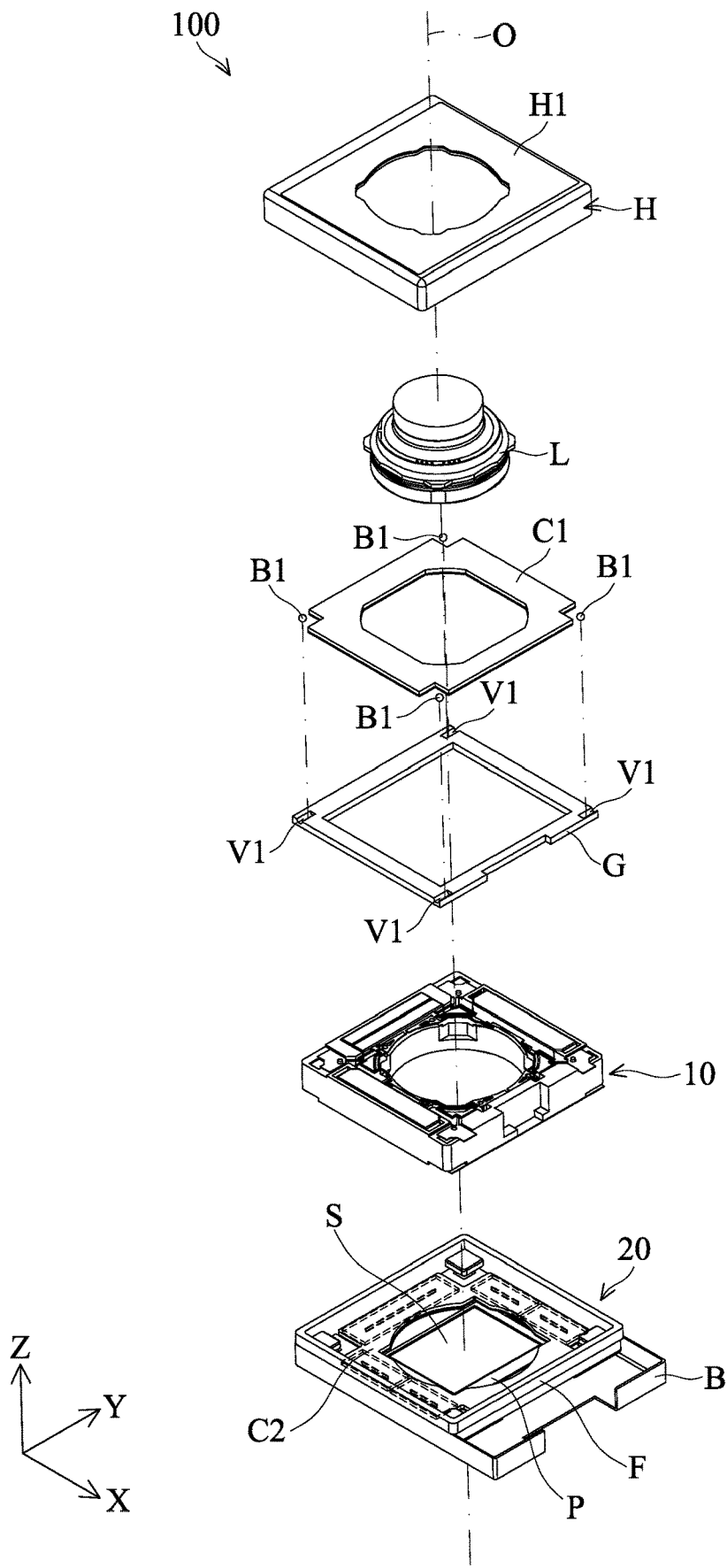
FIG. 1 is an exploded diagram of an optical mechanism 100 in accordance with an embodiment of the invention.
Figure 2:
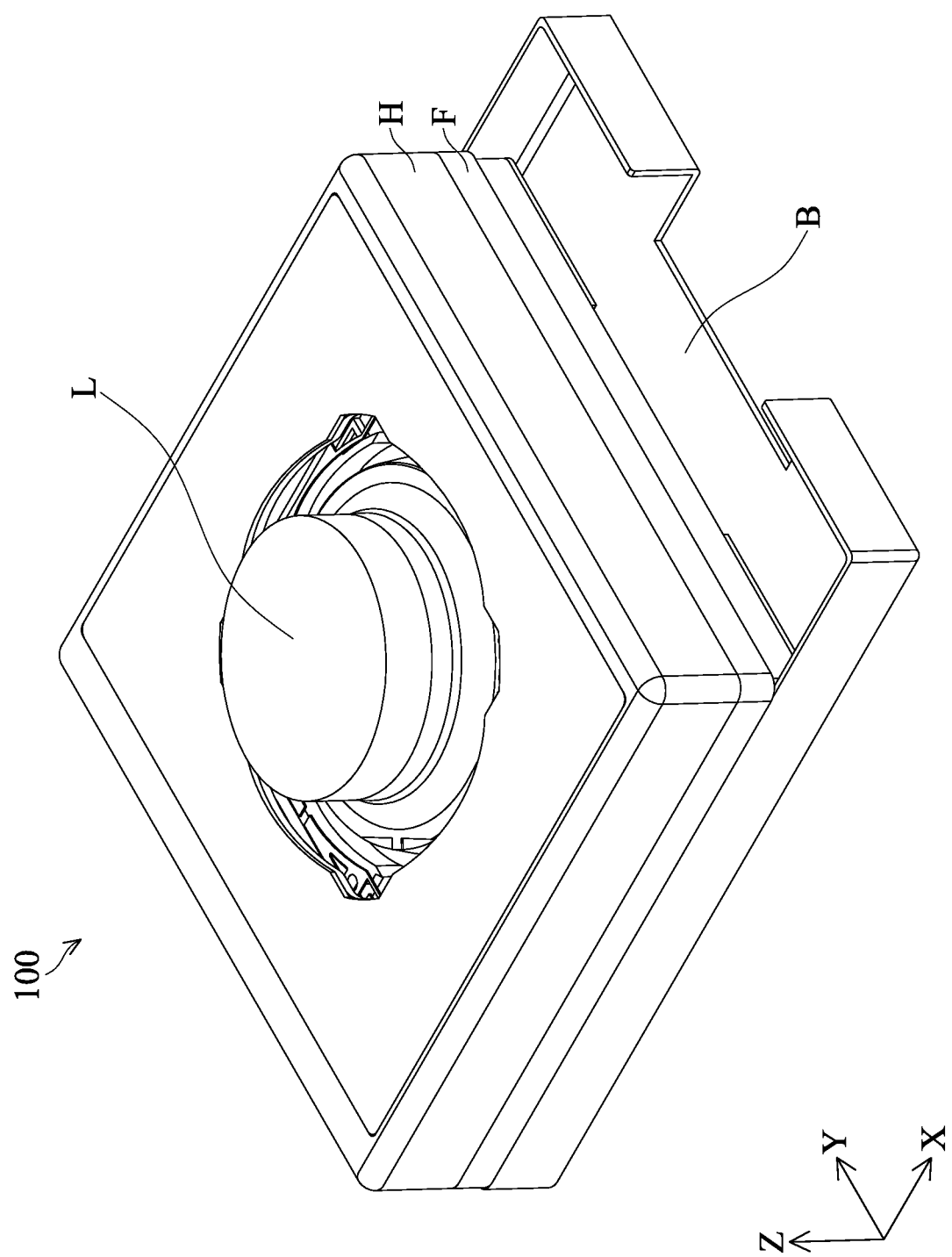
FIG. 2 is a perspective diagram of the optical mechanism 100 in FIG. 1 after assembly.
Figure 3:
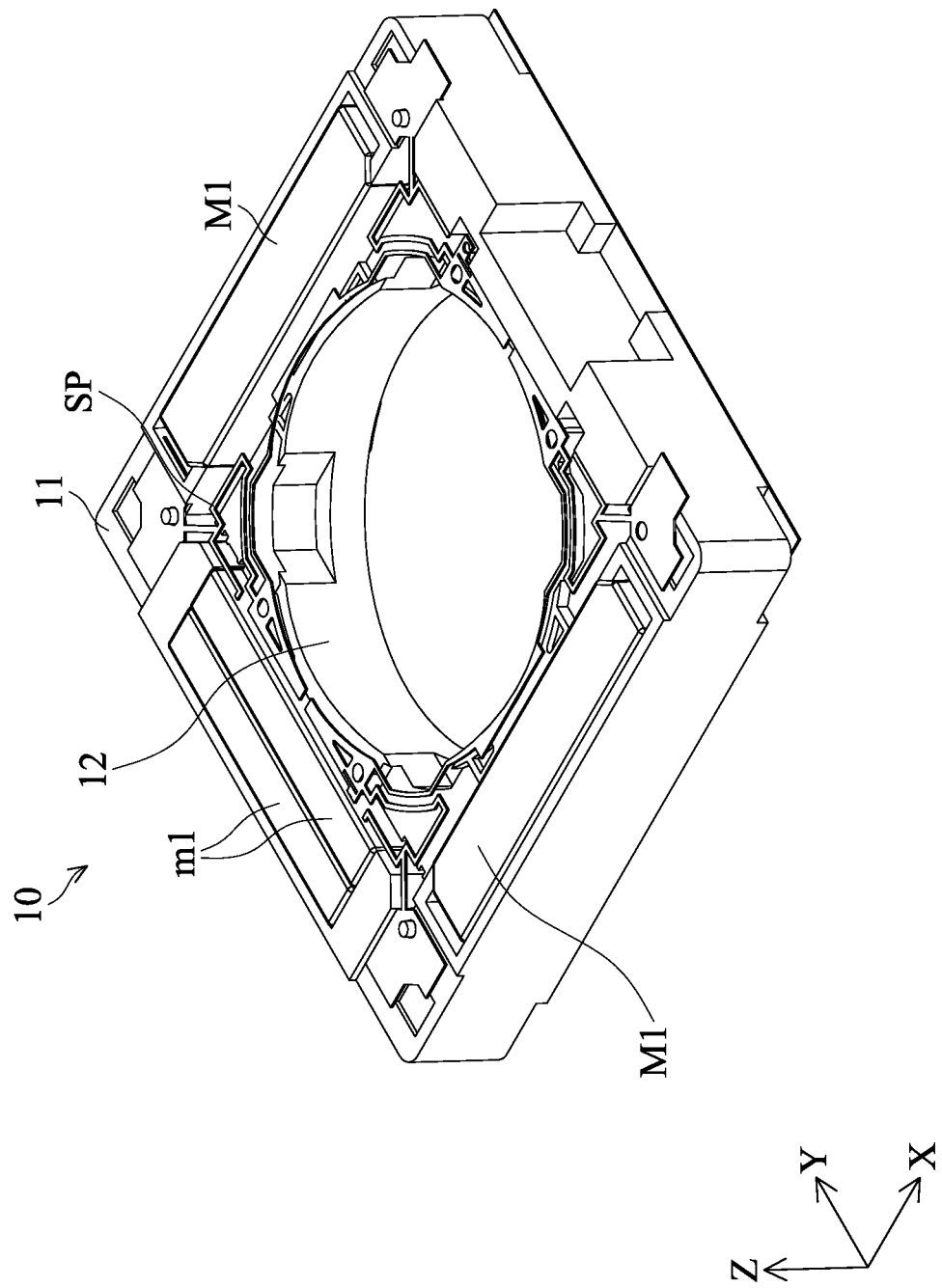
FIG. 3 is a perspective diagram of the movable module 10 in FIG. 1.
Figure 4:
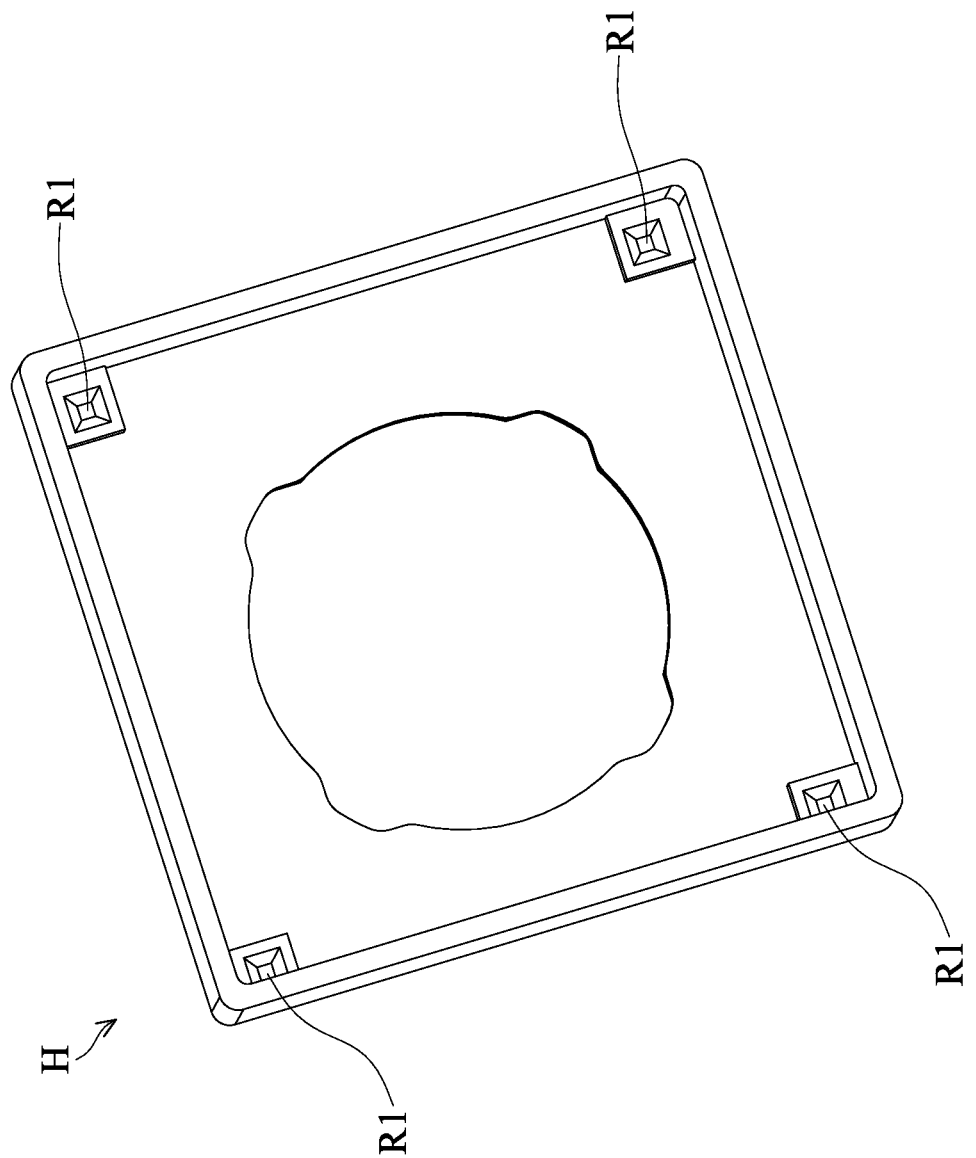
FIG. 4 is a perspective diagram of the cover H in FIG. 1.
Figure 5:
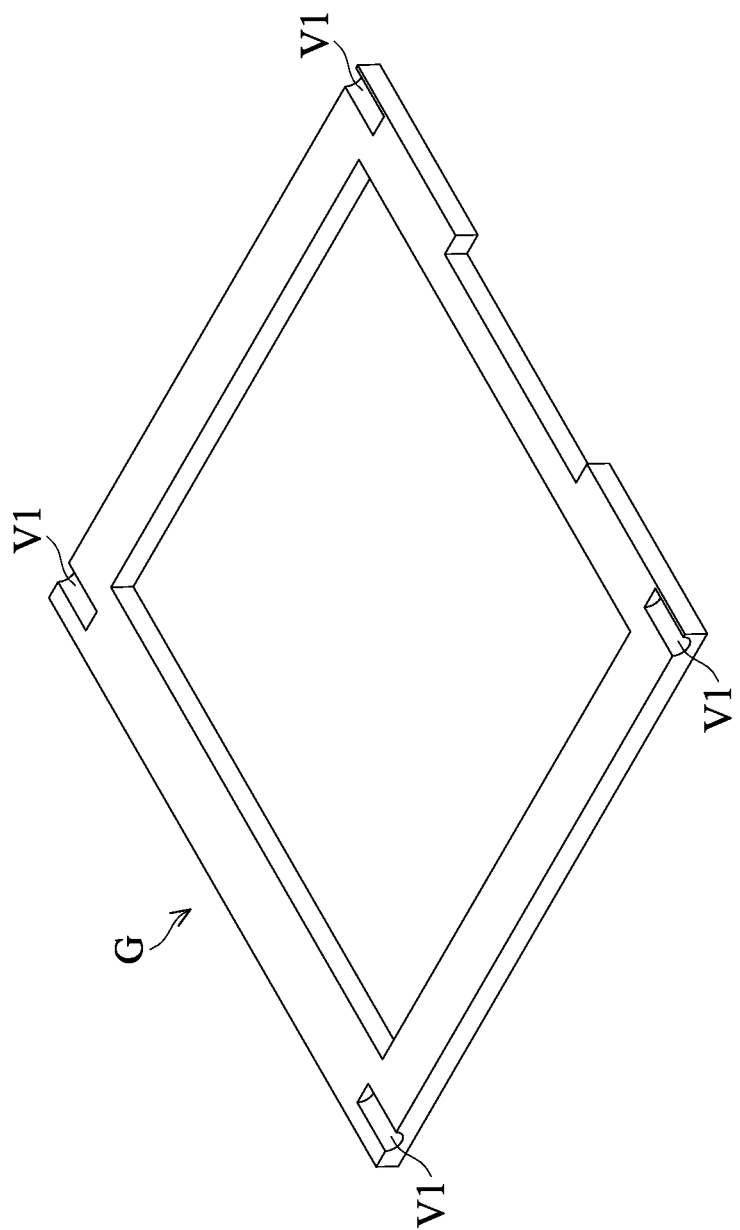
FIG. 5 is a perspective diagram of the guiding member G in FIG. 1.
Figure 6:
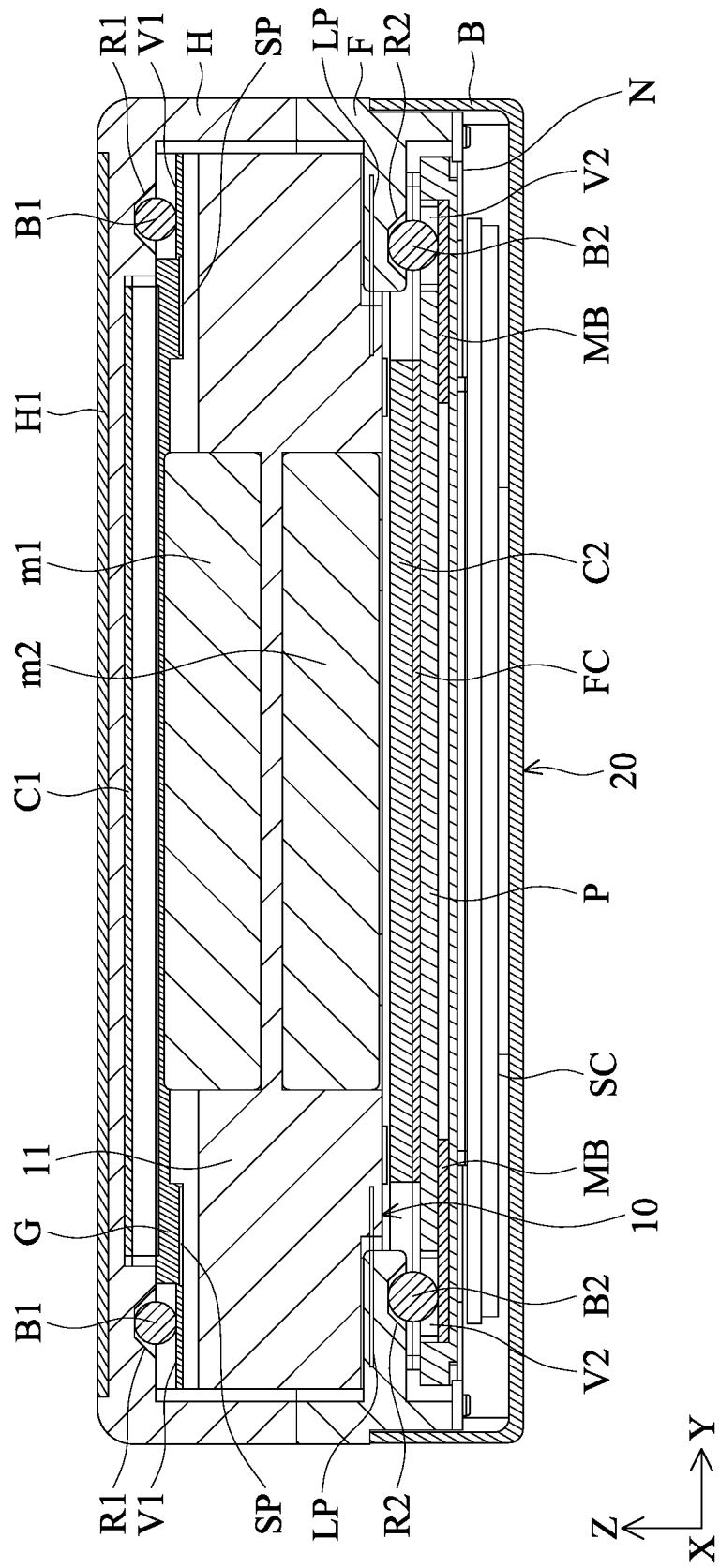
FIG. 6 is a cross-sectional view of the optical mechanism 100 with the optical element removed therefrom.

FIG. 1 is an exploded diagram of an image capturing mechanism 100 in accordance with an embodiment of the invention. FIG. 2 is a perspective diagram of the image capturing mechanism 100 in FIG. 1 after assembly. FIG. 3 is a perspective diagram of the movable module 10 in FIG. 1. FIG. 4 is a perspective diagram of the cover H in FIG. 1. FIG. 5 is a perspective diagram of the guiding member G in FIG. 1. FIG. 6 is a cross-sectional view of the image capturing mechanism 100 with the optical element removed therefrom.

Referring to FIGS. 1-6, the image capturing mechanism 100 in this embodiment may be a disposed in a camera device, and it primarily includes a cover H, an optical element L, a coil element C1 (e.g. planar coil), several rollers B1, a guiding member G, a movable module 10, and a base module 20.

The movable module 10 is movable disposed between the cover H and the base module 20, and the optical element L (e.g. optical lens) is disposed in the movable module 10. Specifically, the optical element L is movable relative to the cover H along the Y or Z axis, so as to achieve Auto-Focusing (AF) or Optical Image Stabilization (OIS) of the optical mechanism 100.

As shown in FIGS. 1, 2, and 6, the base module 20 includes a bottom case B, a frame F, a substrate P, a coil element C2, and an image sensor S. The frame F is affixed between the cover H and the bottom case B, the substrate P is disposed in the frame F, and the image sensor S and the coil element C2 are disposed on the substrate P. Light can enter the image capturing mechanism 100 and propagate through the optical element L to the image sensor S along an optical axis O of the optical element L, whereby a digital image can be generated.

In this embodiment, at least a ball element B2 (FIG. 6) is disposed between the substrate P and the frame F, so that the substrate P is movable relative to the frame F. As a result, the image sensor S and the substrate P can move together relative to the frame F and the bottom case B along the X axis (first axis) or/and the Y axis (second axis), thereby achieving the function of Optical Image Stabilization (OIS).

Figure 17:
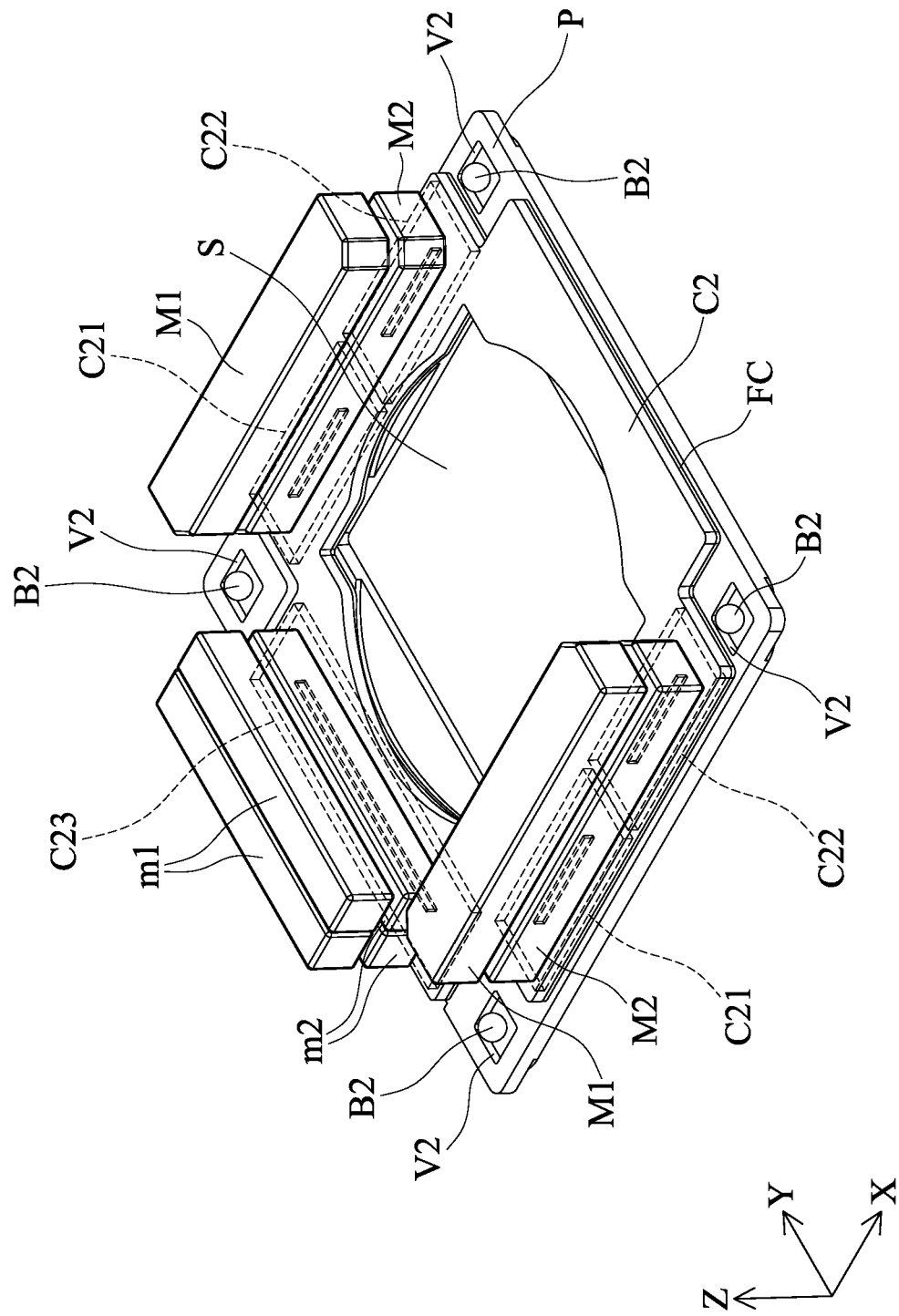
FIG. 17 is a perspective diagram showing the relative position of the planar coils C21, C22, and C23 of the coil element C2 and the magnetic elements M1, M2, m1, and m2 on the hollow member 11.

Moreover, as shown in FIGS. 3, 6, and 17, the movable module 10 includes a rectangular hollow member 11, a holder 12 configured to hold the optical element L, a first spring sheet SP, and several magnetic elements M1, M2, m1, and m2 (FIG. 17). The magnetic elements M1, M2, m1, and m2 may comprise magnets that are disposed on three sides of the hollow member 11. The holder 12 is movably connected to the hollow member 11 via a first spring sheet SP, and the hollow member 11 is movably connected to the frame F via a second spring sheet LP (FIG. 6). Therefore, the movable module 10 can move relative to the frame F and the cover H.

The optical element L is affixed in the holder 12, and at least a coil (not shown) is disposed on the outer surface of the holder 12. When a current signal is applied to the coil, the magnetic elements M1, M2 and the coil can produce an electromagnetic force driving the optical element L and the holder 12 to move relative to the hollow member 11 along the optical axis O of the optical element L (Z direction), thereby achieving the function of Auto-Focusing (AF).

As shown in FIGS. 1, 4, 5, and 6, the coil element C1 is attached to an inner surface of the cover H, and the guiding member G is affixed to the hollow member 11 of the movable module 10. Specifically, four rollers B1 are disposed between the grooves V1 of the guiding member G and the cavities R1 formed on the inner surface of the cover H. When a current signal is applied to the coil element C1, the magnetic elements M1, m1 and the coil element C1 can produce an electromagnetic force driving the movable module 10 to move relative to the cover H along the Y axis, thereby achieving the function of Optical Image Stabilization (OIS).

For example, the cover H may comprise metal material, such as the metal sheets H1 show in FIGS. 1 and 6. Hence, a magnetic attractive force can be generated between the cover H and the magnetic elements M1, m1, so that the rollers B1 remain in contact between the guiding member G and the cover H.

In this embodiment, the grooves V1 and the rollers B1 are located close to the corners of the movable module 10, however, they can also be disposed on the four sides or located in other positions of the movable module 10. Moreover, the grooves V1 may be omitted from the guiding member G, and the magnetic elements M1, m1 and the coil element C1 can produce an electromagnetic force driving the movable module 10 to move relative to the cover H along the X axis (first axis) or/and the Y axis (second axis) at the same time, not limited to the embodiment described above.

Figure 7:
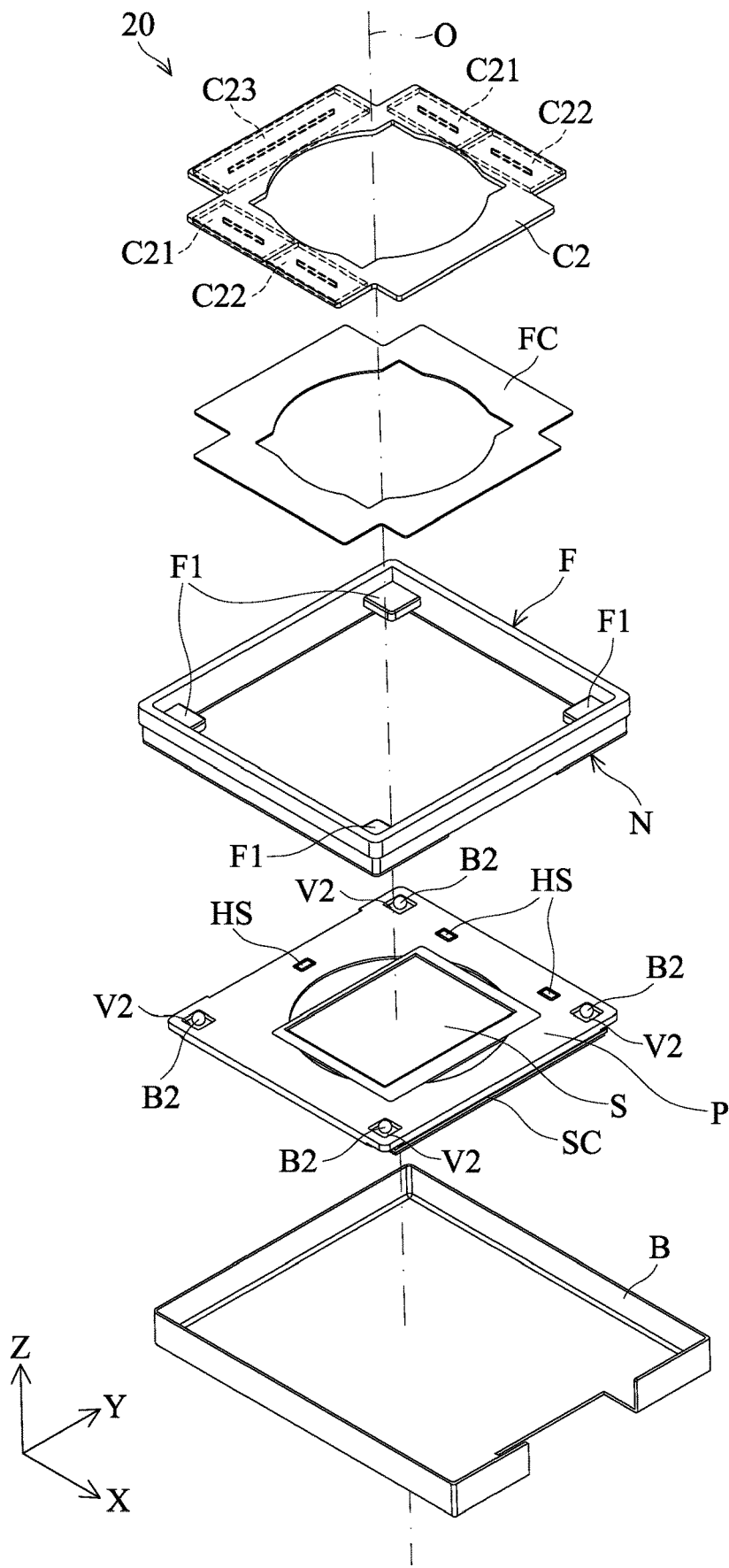
FIG. 7 is an exploded diagram of the base module 20 in FIG. 1.
Figure 8:
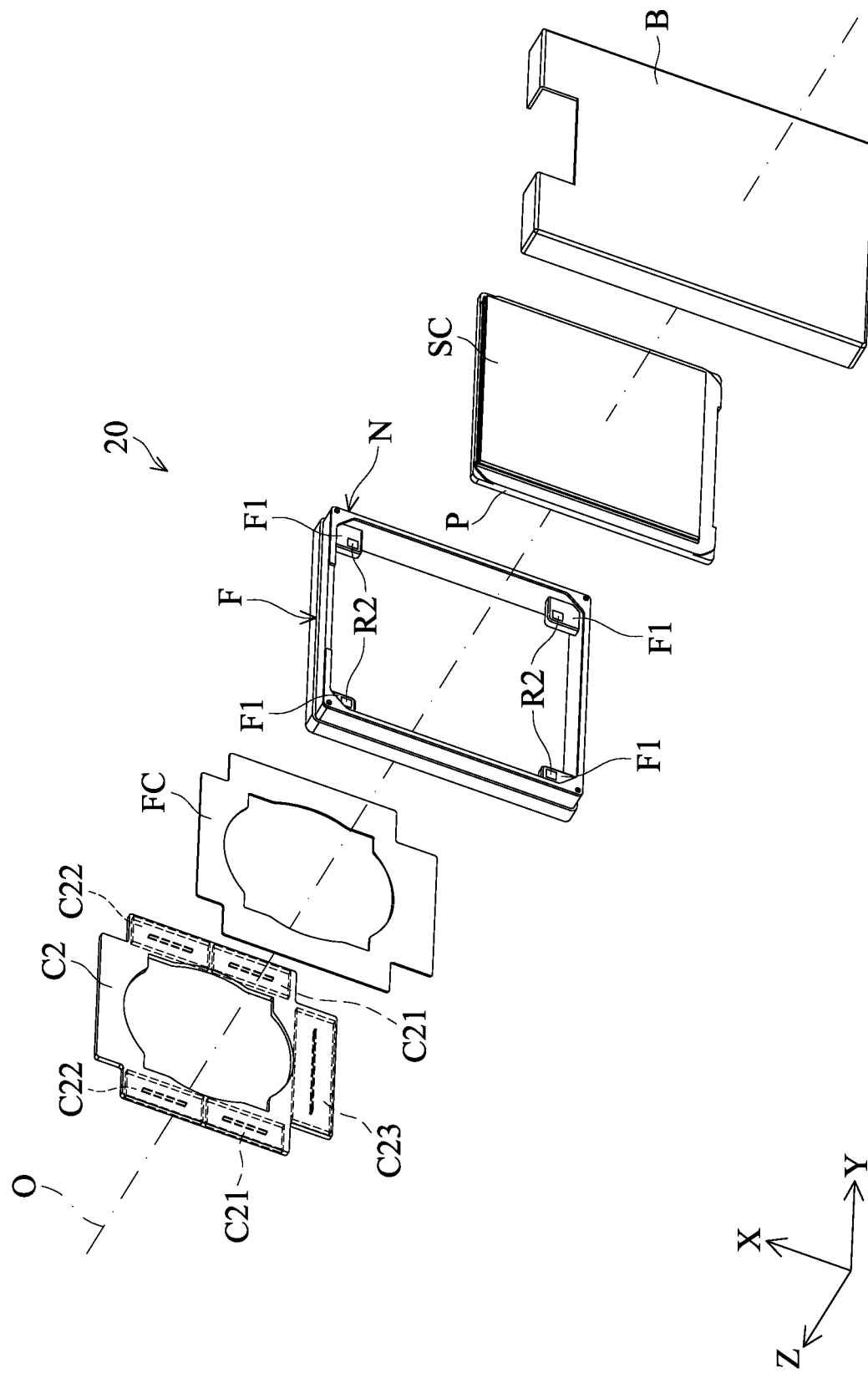
FIG. 8 is another exploded diagram of the base module 20 in FIG. 1.
Figure 9:
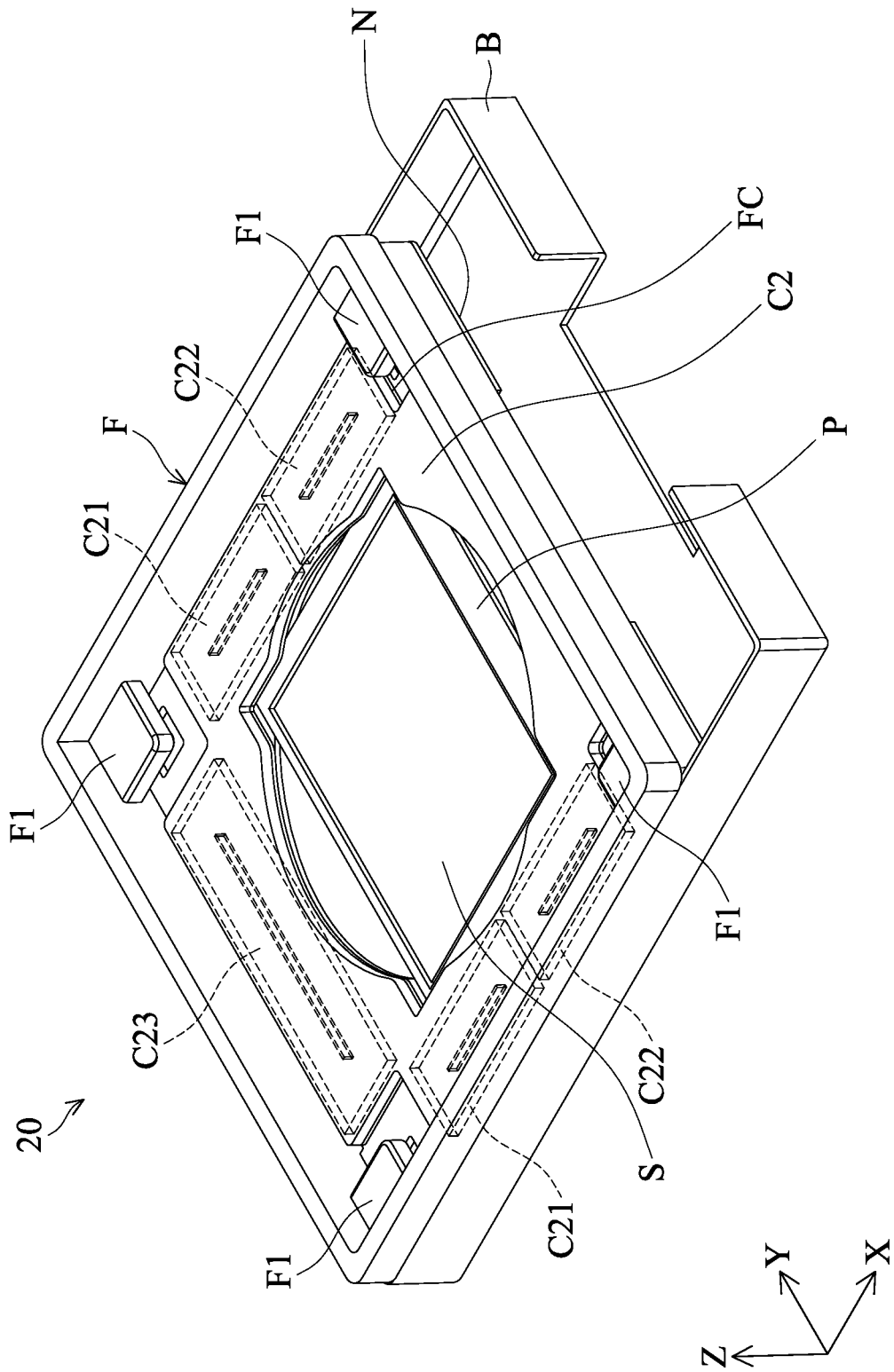
FIG. 9 is a perspective diagram of the base module 20 in FIGS. 7 and 8 after assembly.
Figure 10:
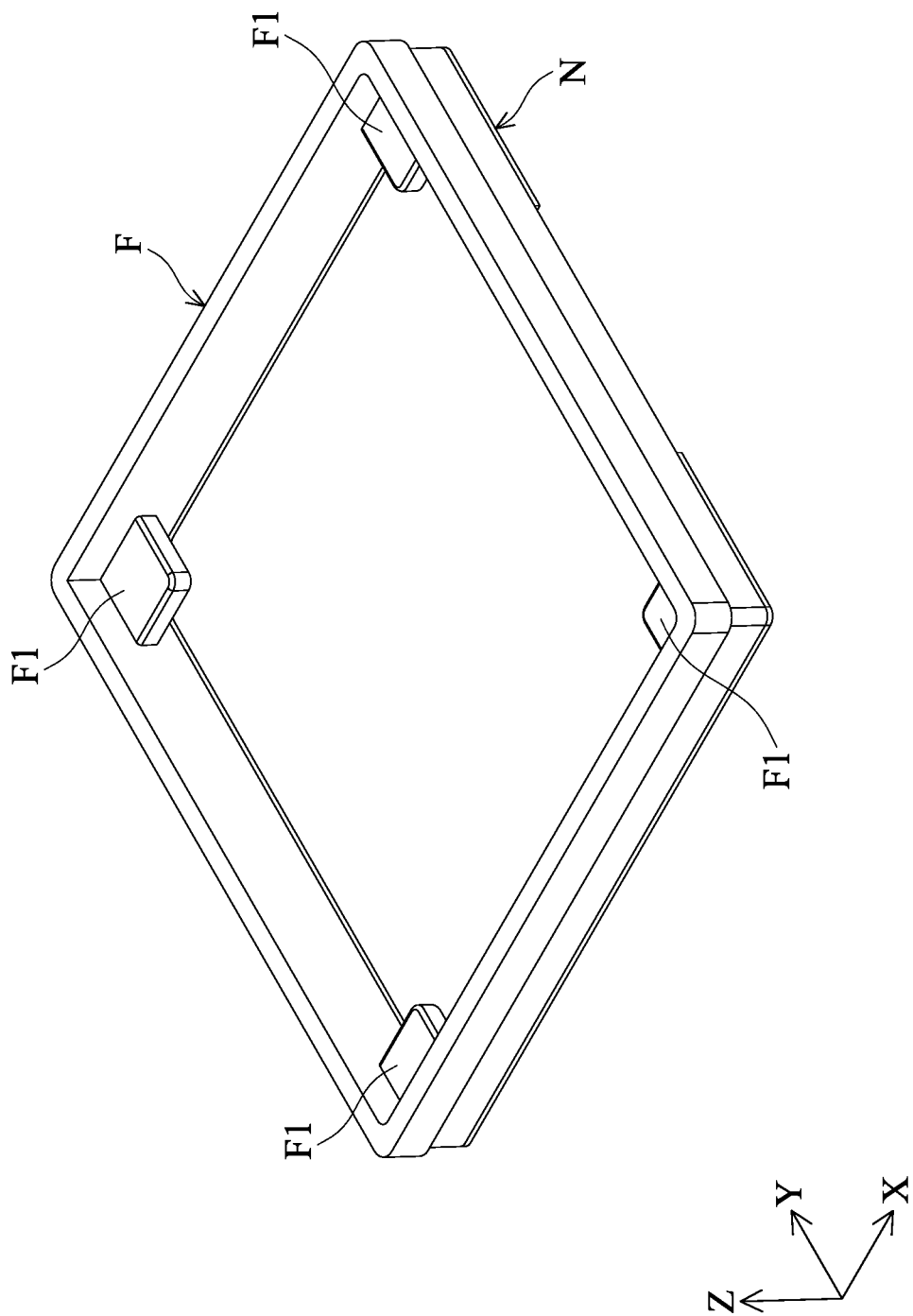
FIG. 10 is a perspective diagram of the frame F in FIGS. 7 and 8.
Figure 11:
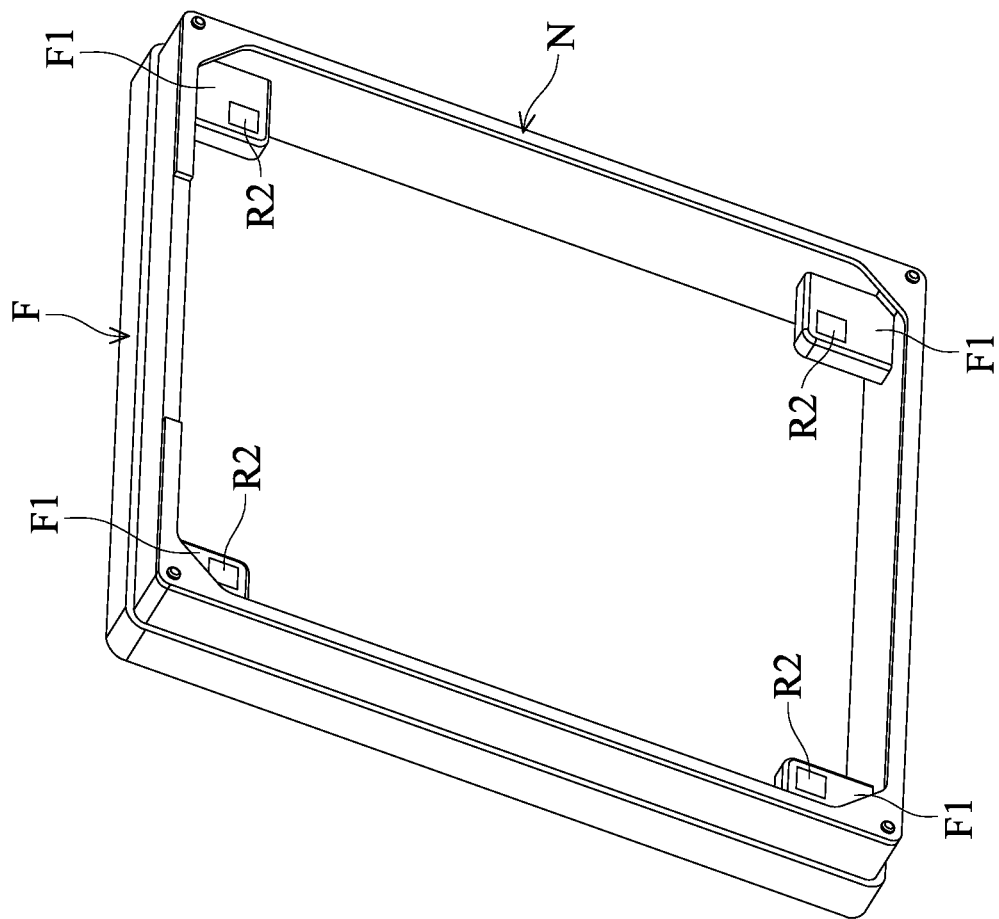
FIG. 11 is another perspective diagram of the frame F in FIGS. 7 and 8.
Figure 12:
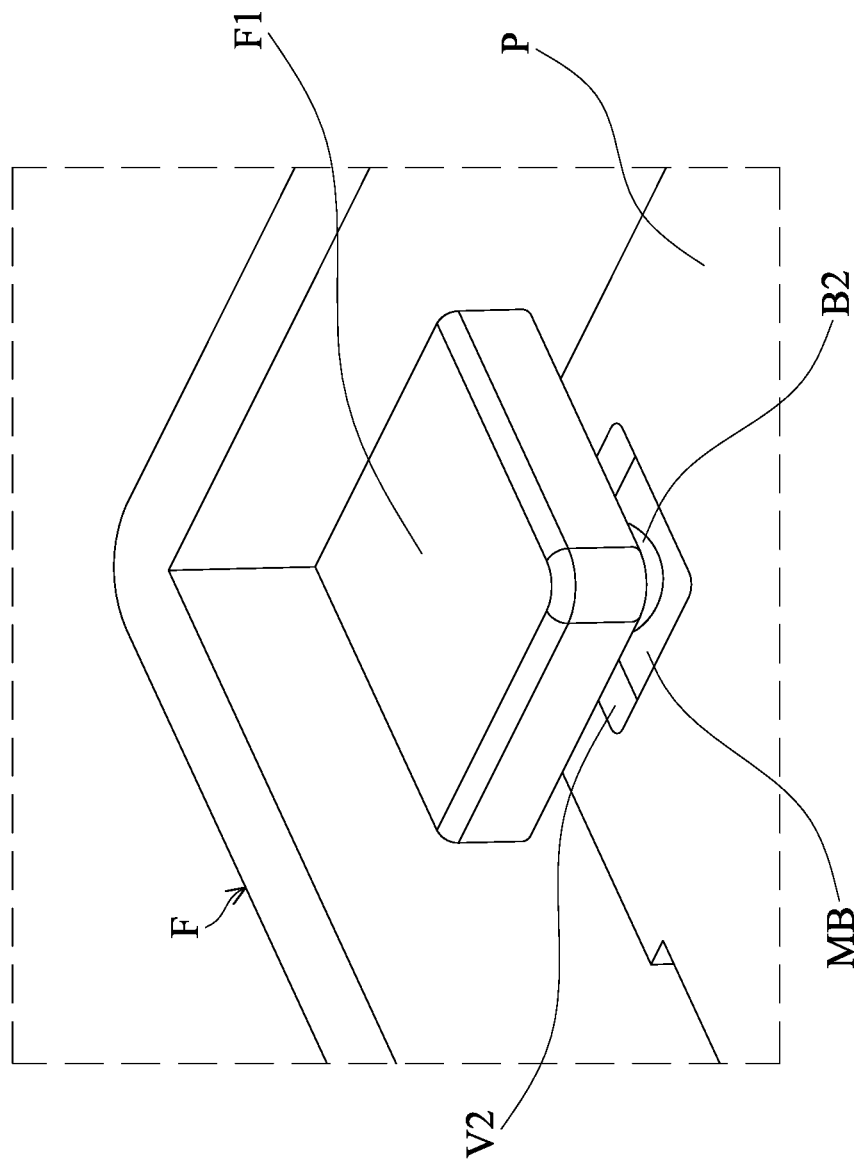
FIG. 12 is an enlarged view showing a ball element B that is disposed between a protrusion F1 of the frame F and a metal member MB embedded in the substrate P.
Figure 13:
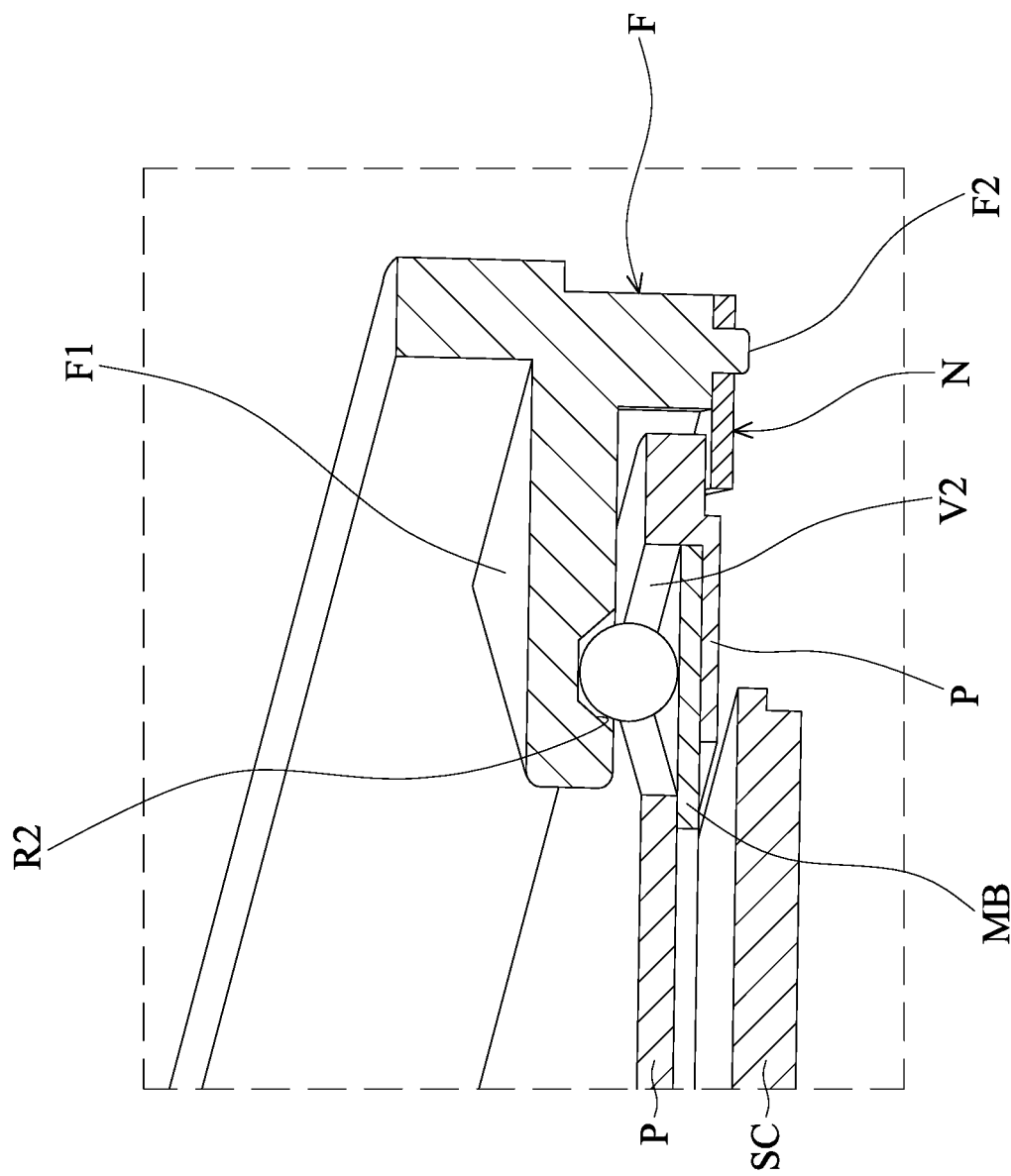
FIG. 13 is a cross-sectional view showing the ball element B in FIG. 12 that is disposed between a protrusion F1 of the frame F and a metal member MB embedded in the substrate P.

FIG. 7 is an exploded diagram of the base module 20 in FIG. 1. FIG. 8 is another exploded diagram of the base module 20 in FIG. 1. FIG. 9 is a perspective diagram of the base module 20 in FIGS. 7 and 8 after assembly. FIG. 10 is a perspective diagram of the frame F in FIGS. 7 and 8. FIG. 11 is another perspective diagram of the frame F in FIGS. 7 and 8. FIG. 12 is an enlarged view showing a ball element B that is disposed between a protrusion F1 of the frame F and a metal member MB embedded in the substrate P. FIG. 13 is a cross-sectional view showing the ball element B in FIG. 12 that is disposed between a protrusion F1 of the frame F and a metal member MB embedded in the substrate P.

Referring to FIGS. 6-11, the base module 20 in this embodiment includes a coil element C2, a circuit element FC, a frame F, a restricting member N, a substrate P, a circuit board SC, several ball elements B2, an image sensor S, and a bottom case B. The frame F is affixed to the bottom case B, and the substrate P is movably disposed in the frame F. The circuit element FC and the coil element C2 are disposed on the substrate P and surround the image sensor S. Light can enter the image capturing mechanism 100 and propagate through the optical element L to the image sensor S of the base module 20 along the optical axis O, whereby a digital image can be generated.

For example, the circuit element FC may comprise a Flexible Printed Circuit (FPC), and the coil element C2 is electrically connected to an external circuit via the circuit element FC. As shown in FIGS. 7-9, the coil element C2 comprises several planar coils C21, C22, and C23 which are located corresponding to the magnetic elements M2 and m2 on the three sides of the hollow member 11 (FIG. 17).

When the planar coils C21, C22, and C23 are energized by current signals from the external circuit, the coil element C2 and the magnetic elements M2, m2 on the hollow member 11 can produce an electromagnetic force driving the substrate P and the image sensor S to move relative to the frame F along the X axis (first axis) or/and the Y axis (second axis), or driving the substrate P and the image sensor S to rotate round the optical axis O relative to the frame F, thus achieving the function of Optical Image Stabilization (OIS).

Here, the frame F has a rectangular structure, and four protrusions F1 are formed at the four corners of the frame F. As shown in FIGS. 8, 11, and 13, the protrusions F1 extend toward the interior of the frame F, and each of the protrusions F1 has a recess R2. Moreover, the substrate P has several openings V2, and the ball elements B2 are received in the recesses R2 of the protrusions F1 and the openings V2 of the substrate P.

As the width of the opening V2 is greater than the diameter of the ball element B2, the ball element B2 can slide within the opening V2, so that the substrate P is movable relative to the frame F along the X axis or/and the Y axis. As a result, the image sensor S can move along the X axis or/and the Y axis relative to the frame F and the bottom case B by the ball elements B2 sliding relative to the substrate P, thus achieving the function of Optical Image Stabilization (OIS).

In FIGS. 7 and 17, several magnetic field sensors HS are embedded in the substrate P to detect the magnetic fields of the magnetic elements M2, m2, whereby the displacement of the movable module 10 relative to the image sensor S can be determined. Here, the image sensor S and the magnetic field sensors HS are disposed through the substrate P and electrically connected to the circuit board SC under the substrate P. Therefore, the image sensor S and the magnetic field sensors HS can be electrically connected to the external circuit via the circuit board SC.

Moreover, as shown in FIGS. 8, 9, 10, 11, and 13, a restricting member N is disposed on the bottom side of the frame F. The restricting member N may comprise metal and have a C-shaped structure. During assembly, the restricting member N is affixed to the bottom side of the frame F by inserting a nub F2 of the frame F through the restricting member N (FIG. 13), so that the substrate P can be restricted between the protrusions F1 of the frame F and the restricting member N.

Specifically, the substrate P, the restricting member N, and the protrusions F1 of the frame F at least partially overlap when viewed along the optical axis O. Hence, the substrate P can be prevented from falling from the bottom side of the frame F.

Figure 14:
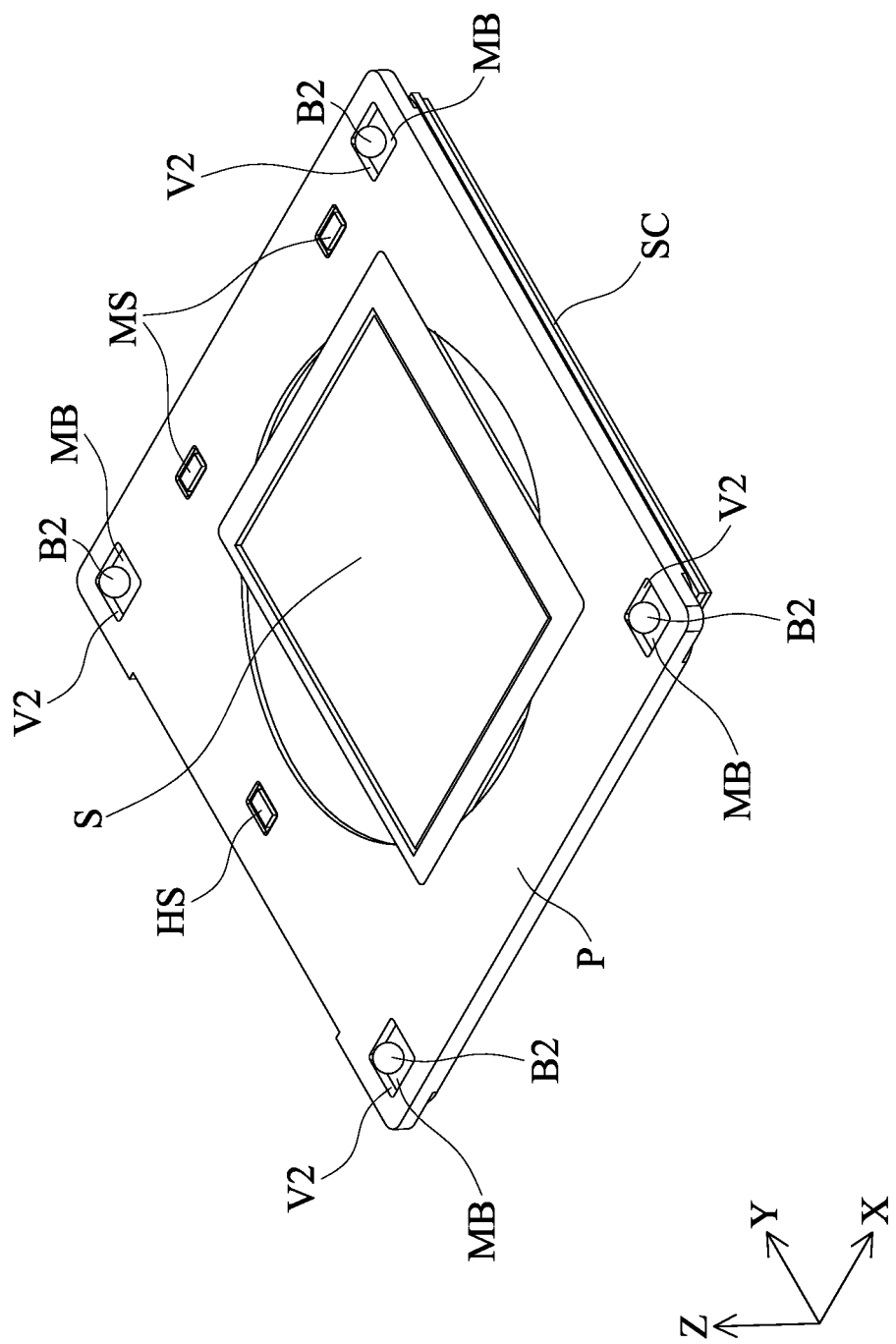
FIG. 14 is a perspective diagram of the substrate P, the ball elements B2, the circuit board SC, the image sensor S, and the magnetic field sensors HS after assembly.
Figure 15:
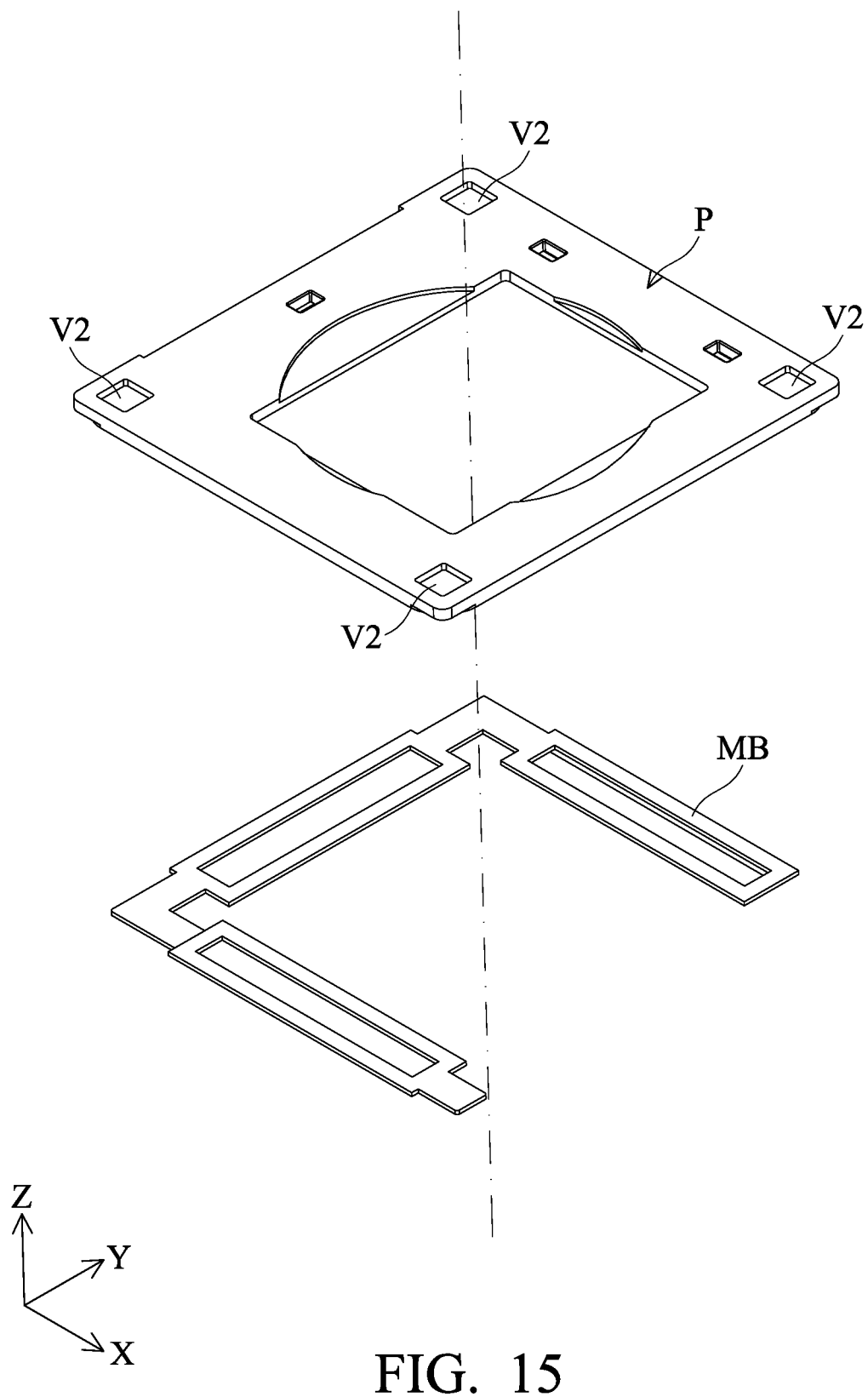
FIG. 15 is an exploded diagram of the substrate P and the metal member MB.
Figure 16:
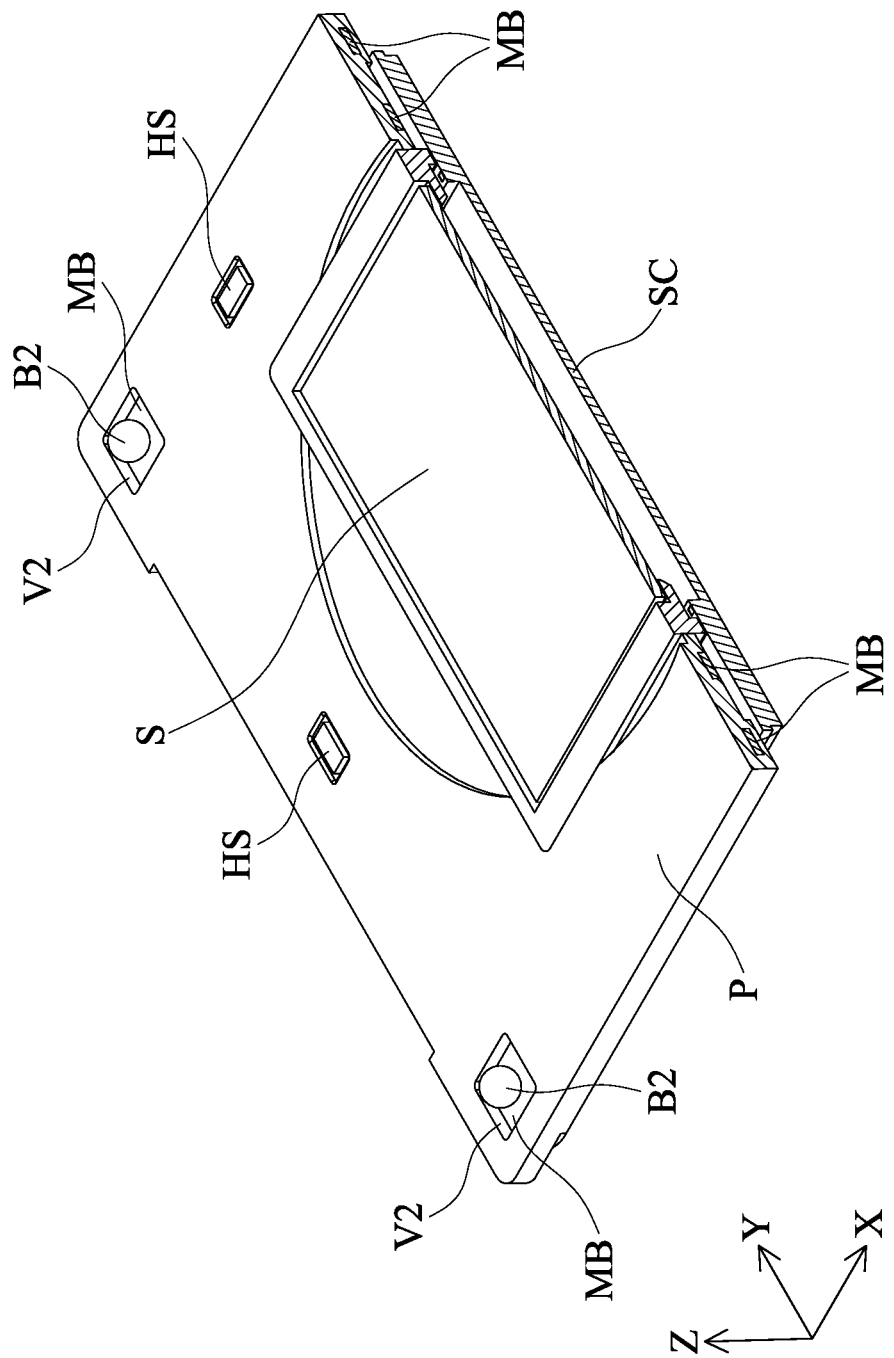
FIG. 16 is a cross-sectional view showing the substrate P and the metal member MB embedded in the substrate P.

FIG. 14 is a perspective diagram of the substrate P, the ball elements B2, the circuit board SC, the image sensor S, and the magnetic field sensors HS after assembly. FIG. 15 is an exploded diagram of the substrate P and the metal member MB. FIG. 16 is a cross-sectional view showing the substrate P and the metal member MB embedded in the substrate P.

Referring to FIGS. 12-16, a metal member MB is integrally formed with the plastic substrate P in one piece by insert molding. Specifically, the metal member MB is exposed to the openings V2 of the substrate P and contacts the ball elements B2, so that the ball elements B2 can slide on the metal member MB.

With the metal member MB embedded in the substrate P, the structural strength of the substrate P can be enhanced, and frictional abrasion of the plastic substrate P can also be prevented, thereby increasing reliability and usage life of the image capturing mechanism 100. Additionally, a magnetic attractive force can be generated between the metal member MB and the magnetic elements M2, m2, so that the ball elements B2 remain in contact between the metal member MB and the protrusions F1 of the frame F.

Figure 18:
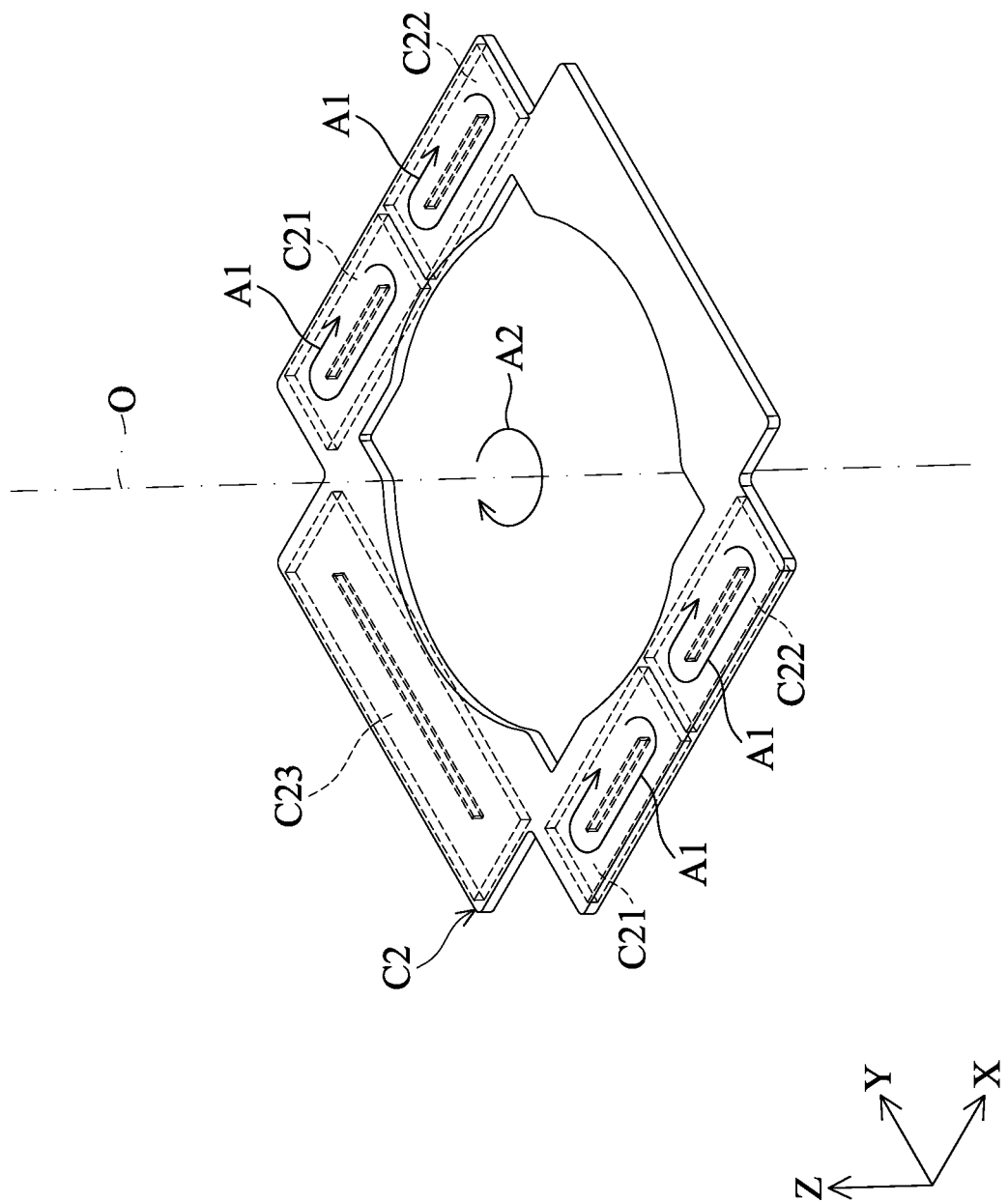
FIG. 18 is a perspective diagram showing the planar coils C21 and C22 of the coil element C2 when energized by the current signals of the same direction A1.

FIG. 17 is a perspective diagram showing the relative position of the planar coils C21, C22, and C23 of the coil element C2 and the magnetic elements M1, M2, m1, and m2 on the hollow member 11. FIG. 18 is a perspective diagram showing the planar coils C21 and C22 of the coil element C2 when energized by the current signals of the same direction A1.

Referring to FIGS. 17 and 18, when the planar coils C21 and C22 of the coil element C2 are energized by appropriate current signals, the magnetic elements M2, m2 and the planar coils C21, C22 can produce an electromagnetic force driving the substrate P and the image sensor S to move relative to the frame F, thereby achieving the function of Optical Image Stabilization (OIS).

In particular, as shown in FIG. 18, two pairs of planar coils C21, C22 are disposed on opposite sides of the coil element C2, and each pair of planar coils C21, C22 is arranged along the X axis (first axis). It should be noted that when the planar coils C21 and C22 of the coil element C2 are energized by the current signals in the same direction A1 (e.g. clockwise direction), the substrate P and the image sensor S can be driven to rotate around the optical axis O relative to the frame F (as the arrow A2 indicates in FIG. 18) by the electromagnetic force generated from the magnetic elements M2, m2 and the planar coils C21, C22, thus achieving the function of Optical Image Stabilization (OIS).

Although some embodiments of the present disclosure and their advantages have been described in detail, it should be understood that various changes, substitutions and alterations can be made herein without departing from the spirit and scope of the disclosure as defined by the appended claims. For example, it will be readily understood by those skilled in the art that many of the features, functions, processes, and materials described herein may be varied while remaining within the scope of the present disclosure. Moreover, the scope of the present application is not intended to be limited to the particular embodiments of the process, machine, manufacture, compositions of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps. Moreover, the scope of the appended claims should be accorded the broadest interpretation so as to encompass all such modifications and similar arrangements.

While the invention has been described by way of example and in terms of preferred embodiment, it should be understood that the invention is not limited thereto. On the contrary, it is intended to cover various modifications and similar arrangements (as would be apparent to those skilled in the art). Therefore, the scope of the appended claims should be accorded the broadest interpretation to encompass all such modifications and similar arrangements.

What is claimed is:

1. An image capturing mechanism, comprising:
    a base module, having a frame, a substrate movably disposed in the frame, and an image sensor disposed on the substrate;
    a ball element, disposed between the frame and the substrate, wherein the image sensor and the substrate are movable relative to the frame; and
    a movable module, configured to hold an optical element and movably connected to the base module,
    wherein the base module further has a coil element disposed on the substrate, and the movable module has a hollow member, a holder movably disposed in the hollow member for holding the optical element, and a magnetic element disposed on the hollow member, wherein when the coil element is energized by a current signal, the magnetic element and the coil element produce an electromagnetic force driving the substrate and the image sensor to move relative to the frame.

2. The image capturing mechanism as claimed in claim 1, wherein the base module has a metal member embedded in the substrate, and the ball element contacts the metal member.

3. The image capturing mechanism as claimed in claim 2, wherein the substrate comprises plastic material, and the metal member is integrally formed with the plastic substrate in one piece by insert molding.

4. The image capturing mechanism as claimed in claim 3, wherein the substrate has an opening, the metal member is exposed to the opening, and the ball element is received in the opening.

5. The image capturing mechanism as claimed in claim 4, wherein the opening has a width greater than the diameter of the ball element.

6. The image capturing mechanism as claimed in claim 2, wherein the frame is rectangular in shape and has a protrusion, and the ball element is held between the metal member and the protrusion of the frame.

7. The image capturing mechanism as claimed in claim 6, wherein the protrusion is located at a corner of the frame.

8. The image capturing mechanism as claimed in claim 7, wherein the protrusion has a recess for receiving the ball element.

9. The image capturing mechanism as claimed in claim 1, wherein the base module further has a circuit board disposed on a bottom side of the substrate, and the image sensor is electrically connected to the circuit board.

10. The image capturing mechanism as claimed in claim 9, wherein the base module further has a magnetic field sensor disposed through the substrate and electrically connected to the circuit board for detecting a magnetic field of the magnetic element.

11. An image capturing mechanism, comprising:
    a base module, having a frame, a substrate movably disposed in the frame, and an image sensor disposed on the substrate;
    a ball element, disposed between the frame and the substrate, wherein the image sensor and the substrate are movable relative to the frame; and
    a movable module, configured to hold an optical element and movably connected to the base module,
    wherein the base module further has a coil element disposed on the substrate, and the movable module has a hollow member and a magnetic element disposed on the hollow member, wherein the coil element has a pair of planar coils arranged along a first axis and located corresponding to the magnetic element, and when the pair of planar coils is energized by two current signals of the same direction, the substrate and the image sensor are driven to rotate around an optical axis of the optical element relative to the frame.

12. The image capturing mechanism as claimed in claim 11, wherein the movable module further has two magnetic elements disposed on the hollow member, and the coil element further has two pairs of planar coils disposed on opposite sides of the coil element and located corresponding to the magnetic elements, wherein when the two pairs of planar coils are energized by a plurality of current signals of the same direction, the substrate and the image sensor are driven to rotate around the optical axis of the optical element relative to the frame.

13. An image capturing mechanism, comprising:
a base module, having a frame, a substrate movably disposed in the frame, and an image sensor disposed on the substrate;
a ball element, disposed between the frame and the substrate, wherein the image sensor and the substrate are movable relative to the frame; and
a movable module, configured to hold an optical element and movably connected to the base module,
wherein the movable module has a hollow member, a holder movably disposed in the hollow member for holding the optical element, a coil disposed on the holder, and a magnetic element disposed on the hollow member, wherein when the coil is energized by a current signal, the magnetic element and the coil produce an electromagnetic force driving the holder and the optical element to move relative to the hollow member.

14. The image capturing mechanism as claimed in claim 13, wherein the movable module further has a first spring sheet movably connecting the holder to the hollow member.

15. The image capturing mechanism as claimed in claim 14, wherein the movable module further has a second spring sheet movably connecting the hollow member to the frame.

16. The image capturing mechanism as claimed in claim 13, wherein the image capturing mechanism further comprises a cover, a roller, and a guiding member, the guiding member is affixed to the hollow member, and the roller is disposed between the cover and the guiding member.

17. The image capturing mechanism as claimed in claim 16, wherein the guiding member forms a groove for receiving the roller.

18. The image capturing mechanism as claimed in claim 13, wherein the base module further has a restricting member affixed to a bottom side of the frame, and the frame has a protrusion, wherein the substrate is restricted between the protrusion and the restricting member.

19. The image capturing mechanism as claimed in claim 18, wherein the substrate, the restricting member, and the protrusion of the frame partially overlap when viewed along an optical axis of the optical element.

* * * * *